Jan. 17, 1967　　　M. L. HANSON ETAL　　　3,299,269
NON-DESTRUCTIVE TESTING METHOD UTILIZING RADIOACTIVE CLATHRATES
Filed June 27, 1963
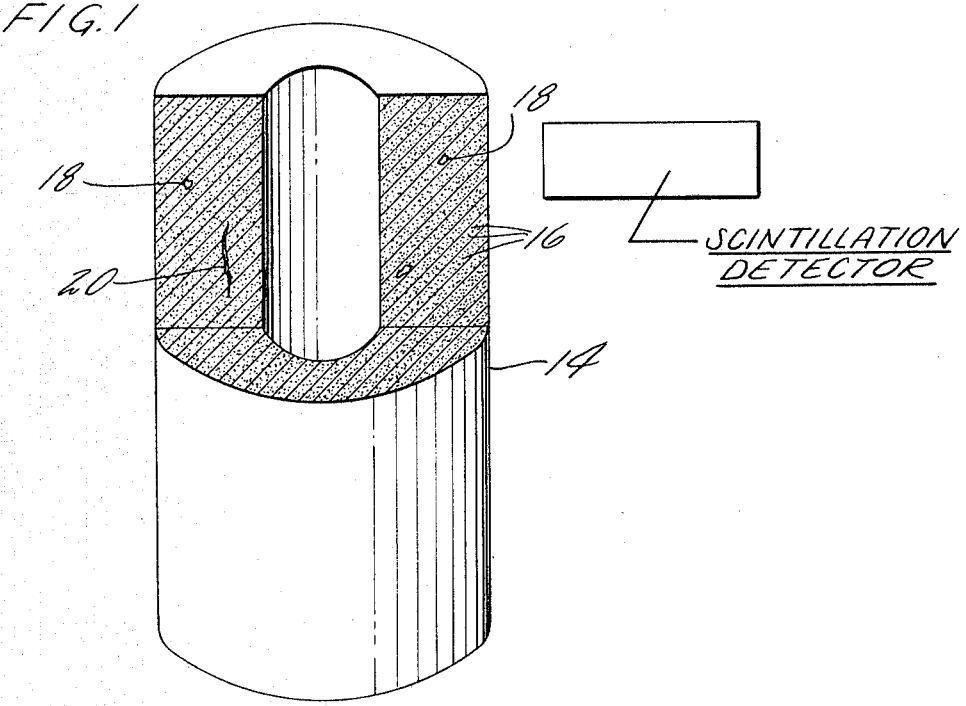
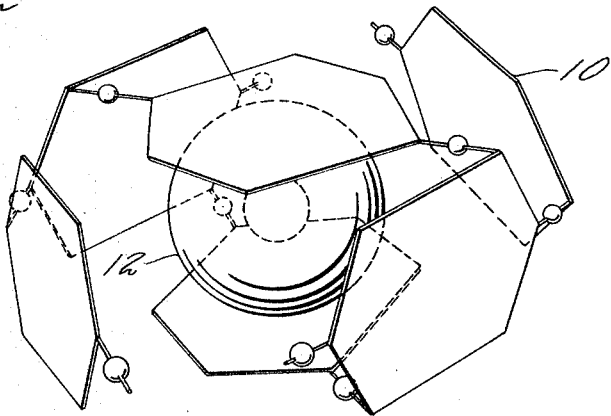
INVENTORS
MERLYN L. HANSON
CHARLES T. BROWN
BY Donald J. Bradley
ATTORNEY

United States Patent Office 3,299,269
Patented Jan. 17, 1967

3,299,269
NON-DESTRUCTIVE TESTING METHOD UTILIZING RADIOACTIVE CLATHRATES
Merlyn L. Hanson, Springfield, Mass., and Charles T. Brown, Windsor, Conn., assignors to United Aircraft Corporation, East Hartford, Conn., a corporation of Delaware
Filed June 27, 1963, Ser. No. 290,947
6 Claims. (Cl. 250—106)

This invention relates to a non-destructive testing method and apparatus for determining the presence of voids, cracks or discontinuities in solid substances, and in particular to the use of radioactive gases for such testing. The method has been developed specifically for use with large solid propellant rocket motors, but need not be limited thereto.

Non-destructive testing techniques for determining the presence of flaws and discontinuities in materials have advanced considerably in recent years. However, none of the present techniques meet the demands imposed by very large solid boosters, and the development of new test methods becomes necessary.

For proper burning of the solid rocket propellant it is necessary that the grain be free of cracks, soft spongy areas and voids. Any defect in the propellant grain will radically affect the burning of a propellant and consequently the time of burning, the temperature and the thrust developed by the rocket. Consequently, for proper performance of the solid propellant rockets, it is essential that those defects in a large rocket motor which may cause malfunction during motor operation be detected. When such faults are detected, the faults may be corrected or the particular propellant grain may be discarded.

While rocket propellant grains vary somewhat in their chemical composition, in general the propellant grains are composed mainly of active ingredients such as ammonium perchlorate imbedded in an inert binder material. After curing, the propellant is in the form of a viscoelastic solid which in many respects is similar to rubber. The propellant grain, which is usually quite large, is encircled with three smaller concentric layers of materials. For a typical solid fuel rocket having an 8' diameter grain, immediately adjacent to the propellant is a thin layer of inert propellant in the form of a liner. Immediately outside the linear is a layer of thermal insulation, the insulation normally being rubber, and having a thickness of approximately ¼ inch. The outside layer is a case having a thickness of approximately ⅓ to ½ inch. The case is generally of steel, but may be composed of Fiberglas.

The propellant itself is a colloidal-suspension, cross-linked matrix material. The primary ingredients in the propellant are $NH_4ClO_4$, aluminum particles, and PBAN (polybutyl acrylo nitrile), the remainder of the propellant being composed of very small percentages of other miscellaneous compounds.

The propellant grain geometry is normally cylindrical, but some grains are star shaped or otherwise segmented. Propellants also come in different chemical types, the most common being polyurethane and PBAN. In addition, propellant grains are frequently formed in the shape of a thick-walled tube, that is, the grain has a cylindrical void along its axis.

This invention involves the use of clathrate crystals having a radioactive gas trapped therein. The clathrate crystals may be ground into a fine powder and included in the propellant mixture. When heated, the radioactive gas trapped in the clathrate crystal is released. Because of the high pressure to which the radioactive gas is subjected when trapped in the clathrate crystal, the radioactive gas will migrate to any voids or pockets in the propellant. Known radioactive detectors such as scintillation spectrometers may then be used to detect the presence of these radioactive gas pockets in the propellant grain.

It is therefore an object of this invention to provide a novel non-destructive testing method for solid structures.

Another object of this invention is to provide a novel non-destructive testing method for solid rocket propellants.

A further object of this invention is the use of clathrate crystals containing radioactive gases for inclusion in solid propellant mixtures.

Another object of this invention is the use of radioactive gases for sensing voids or discontinuities in a solid propellant.

Another object of this invention is a method for concentrating radioactive gases in voids or discontinuities in a solid propellant.

These and other objects and a fuller understanding of this invention may be had by referring to the following description and claims read in conjunction with the accompanying drawings, in which:

FIGURE 1 shows a typical solid rocket grain incorporating the features of this invention; and FIGURE 2 shows schematically a clathrate.

A clathrate is a molecular cage within which a second substance is trapped. Hydroquinone clathrates have the ability to trap radioactive isotopes of argon, krypton and xenon within the molecular crystal structure of the hydroquinone. Such radioactive clathrate substances are well known in the art. An article entitled "Krypton in a Cage-Clathrate Beta Sources," by D. J. Chleck and C. A. Zeigler in the September 1959 edition of Nucleonics, at page 130 describes the manufacture of a radioactive clathrate substance.

Referring to FIGURE 2, the clathrates themselves are crystalline structures wherein hydroquinone molecules 10, crystalized from a melt under pressure, form a cage to hold atoms 12 of krypton, xenon or similar gases. The clathrates can be powdered into grains the size of salt or sugar. Little of the radioactivity is lost in powdering. Moreover there is little leakage, being a few parts per million per day.

If a radioactive isotope having a high gamma emission characteristic such as krypton 79 is incorporated or trapped in the clathrate crystal, the clathrate may then be used to sense the presence of voids or discontinuities in a solid material such as a solid propellant. Krypton 79 has a half life of approximately 34 hours. The clathrate powder having a radioactive krypton trapped therein may be included in the mixture when fabricating a solid rocket propellant. The impurities caused by the clathrate would have little or no effect on the performance of the propellant itself. The quantity of the clathrate to be included in the propellant mix would depend upon the chemical composition of the propellant itself, the clathrate material used, the radioactive isotope trapped within the clathrate, and the pressure under which the clathrate crystal was fabricated. FIGURE 1 shows a typical solid propellant grain 14 in which a proper quantity of clathrate powder 16 has been incorporated. For purposes of illustration, grain 14 is assumed to contain voids 18 and discontinuity or crack 20.

After the propellant grain is formulated and fabricated, heating of the propellant 14 to a temperature of about 120° C. (248° F.) for krypton 79 will break down the clathrate molecular cage and release the radioactive krypton. The temperature to which the clathrate powder 16 must be heated to release the trapped gas is a function of the crystalline and molecular structure of the particular clathrate used. The quantity of gas released when the propellant is annealed at a temperature of about 160° F. is negligible.

Clathrates are formed under very high pressures. For example, 25.8 atmospheres of krypton can be trapped in one mole of the clathrate and subsequently released by heating. When released, the gas being under great pressure will expand into the voids 18 or discontinuities 20 in the propellant. These voids or pockets of radioactive krypton 79 can then be sensed by any known means such as a scintillation detector 22 or spectrometer or by exposing a photographic film to the gamma radiation released by the radioactive krypton.

Krypton 79 is merely illustrative of a radioactive isotope which may be useful in performing this invention. Because of the thickness of the usual solid propellant, a radioactive substance having high gamma emission is essential. In addition, krypton 79 has a half life of 34 hours so that it is possible to perform the testing for voids or discontinuities within a day or so after fabrication of the propellant. If the half life of the radioactive isotope is too long, radiation problems in both the propellant and in the combustion products of the propellant would cause shielding difficulties.

For other materials than solid propellants it is possible that radioactive isotopes which emit beta particles may be useful, but because of the size of solid rocket propellants such particles would probably be completely absorbed.

By scanning the propellant grain, both inside and outside, it is possible both to determine the presence or absence of flaws or discontinuities, and by using triangulation techniques to determine the exact radial position of such flaws.

This invention is not limited to the use of krypton 79, but includes any radioactive isotope or other gas having properties which will enable it to be sensed by outside means.

While the invention has been described with a certain amount of particularity, it is obvious that numerous modifications may be made without departing from the scope of the invention as hereinafter claimed.

We claim:

1. A method of detecting voids in a solid body comprising the steps of imbedding a powdered clathrate material having a radioactive gas with a relatively high gamma emission trapped therein in the body homogeneously mixing said clathrate material into said body, heating said body to a temperature sufficient to break down said clathrate and release said gas, and inspecting said body to determine the presence of pockets of said gas within said body.

2. A method of detecting voids in a solid rocket propellant comprising the steps of imbedding a clathrate material having a radioactive gas trapped therein in the propellant, homogeneously mixing said clathrate material into said propellant, heating said propellant to release the gas from said clathrate, and inspecting said propellant to determine the presence of pockets of said gas within said propellant.

3. A method of detecting voids as in claim 2 in which said clathrate is a powder which has trapped therein a radioactive gas with a relatively high gamma emission.

4. A method of detecting voids as in claim 2 in which said radioactive gas is an isotope of a gas within the class consisting of argon, krypton and xenon.

5. A method of detecting voids in a solid rocket propellant comprising the steps of homogeneously imbedding a clathrate having a radioactive gas trapped therein in the propellant mixture, annealing said mixture to form said propellant, heating said propellant to a temperature sufficient to release said gas, and inspecting said propellant to determine the presence of pockets of radioactive gas within said propellant.

6. A method of detecting voids in a solid body comprising the steps of imbedding a clathrate powder having a radioactive gas trapped therein within the mixture from which said body is formulated, formulating said body with said clathrate mixed homogeneously therein, heating said body to a temperature sufficient to release said gas, and inspecting said body to determine the presence of pockets of radioactive gas within said body.

References Cited by the Examiner

UNITED STATES PATENTS 2,844,735   7/1958   Creutz _____ 250—106

OTHER REFERENCES

Krypton in a Cage—Clathrate Beta Sources by Chleck et al., Nucleonics, vol. 17, No. 9, September 1959, pp. 130–133.

ARCHIE R. BORCHELT, *Primary Examiner.*

JAMES W. LAWRENCE, RALPH G. NILSON,
*Examiners.*